US006507855B1

(12) United States Patent
Stern

(10) Patent No.: US 6,507,855 B1
(45) Date of Patent: Jan. 14, 2003

(54) METHOD AND APPARATUS FOR EXTRACTING DATA FROM FILES

(75) Inventor: Thomas A. Stern, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/104,755

(22) Filed: Jun. 25, 1998

(51) Int. Cl.[7] ............................................. G06F 17/00
(52) U.S. Cl. .................... 707/513; 717/123; 707/539
(58) Field of Search ........................... 707/513, 1, 102, 707/511, 530–531, 539; 395/701, 702, 703; 717/1, 3, 5, 100, 123, 110, 113, 120

(56) References Cited

U.S. PATENT DOCUMENTS

| | | | | |
|---|---|---|---|---|
| 4,860,203 A | * | 8/1989 | Corrigan et al. ................ | 717/5 |
| 5,038,316 A | * | 8/1991 | Hempleman et al. ........ | 364/900 |
| 5,408,667 A | * | 4/1995 | Brodie et al. ................ | 395/700 |
| 5,432,903 A | * | 7/1995 | Frid-Nielsen .............. | 717/1 X |
| 5,452,206 A | * | 9/1995 | Turrietta et al. ........ | 364/419.17 |
| 5,513,305 A | * | 4/1996 | Maghbouleh ................ | 707/500 |
| 5,655,130 A | * | 8/1997 | Dodge et al. ................ | 707/511 |
| 5,687,365 A | * | 11/1997 | Velissaropoulos et al. ... | 395/613 |
| 5,748,878 A | * | 5/1998 | Rees et al. ..................... | 714/38 |
| 5,815,717 A | * | 9/1998 | Stack .............................. | 717/5 |
| 5,890,180 A | * | 3/1999 | Fenton ......................... | 707/530 |
| 5,903,897 A | * | 5/1999 | Carrier, III et al. .......... | 707/203 |
| 5,924,109 A | * | 7/1999 | Ackerman et al. ........... | 707/531 |
| 5,940,615 A | * | 8/1999 | Novick et al. .............. | 395/701 |
| 5,953,526 A | * | 9/1999 | Day et al. ..................... | 395/701 |
| 5,987,251 A | * | 11/1999 | Crockett et al. ............. | 717/5 X |
| 5,991,782 A | * | 11/1999 | Miyagawa et al. ......... | 707/513 |
| 6,009,441 A | * | 12/1999 | Mathieu et al. .............. | 707/526 |
| 6,014,680 A | * | 1/2000 | Sato et al. ................... | 707/513 |
| 6,295,645 B1 | * | 9/2001 | Brewer ........................ | 717/173 |
| 6,311,327 B1 | * | 10/2001 | O'Brien et al. ............... | 714/35 |

OTHER PUBLICATIONS

Aitken, Peter, Learning C, Sams Publishing, pp. 434–435, 447–451, Dec. 1994.*
Flanagan, David, Java in a Nutshell, second edition, O'Reilly & Associates, pp. 233–234, 253–256, May 1997.*
Kernighan, Brian W. et al, The C Programming Language, Prentice–Hall, Inc., pp. 8, 69, 86, 110–117, 124–126, 131, 207–208, 132, Dec. 1978.*
Vander Veer, Emily A., Javabeans for Dummies, IDG Books Worldwide, Inc., pp. 59–60, 293, Dec. 1997.*
"Computer Program Documentation", IBM Technical Disclosure Bulletin, vol. 24, Issue 12, p. 6540, May 1982.*
"Self Documenting Macros", IBM Technical Disclosure Bulletin, vol. 15, Issue 7, pp. 2153–2155, Dec. 1972.*
Main, Michael et al, Data Structures and Other Objects Using C++, pp. 3, 254–255, 470–475, Jun. 1997.*
Lou Burnard, TEIEDW25 What is SGML and How Does it Help?, http://www.oasis–open.org/cover/edw25.html, Oct. 1991.

* cited by examiner

Primary Examiner—Joseph H. Feild
(74) Attorney, Agent, or Firm—Beyer, Weaver & Thomas, LLP.; Mary R. Olynick, Esq.

(57) ABSTRACT

A system and method are disclosed for creating or modifying a documentation output object that describes a portion of computer code. A documentation input object within a code file that is associated with a first documentation information object is provided. The first documentation information object is extracted based on the documentation input object. The first documentation information object is output to the documentation output object. A method is also disclosed for creating a data structure. A computer readable medium containing program instructions for creating or modifying a documentation output object that describes a portion of computer code is also disclosed.

39 Claims, 12 Drawing Sheets

| Control Tag Name | Description |
| --- | --- |
| edt: *(required)* | Marks the beginning of an embedded documentation template (edt). |
| | edt: {chapter\|*} {category\|*} {standardized_name} |
| | Chapter determines where in the final document the API item will be listed. This value is required and has no default. A global default for the file can be created by placing default_chapter: {chapter} in any comment at the beginning of the file. If a default has been declared in this way, then the parameter in the edt; line can be replaced with a wildcard character (*). Category indicates to docx what method of lexical analysis should be used to identify and extract the API prototype from the code following the template. |
| | Valid keywords are: function, structure, macro, enum, variable, inline, union, and remark. |
| | The keyword 'remark' is the category filed disables prototype extraction and automatically prevents the printing of documentation filed for the remark template. The category filed defaults to 'function'. This default can be changed with default_category: {category}. A wildcard character (*) in the category position of the edt: line indicates that the default should be used. |
| | The standardization name is the name by which the API item will be referenced in indexes. Examples: Functions usually terminate in parentheses such as my_function(). Arrays usually terminate in brackets: my_array[]. Macros are usually shown in upper case: MY_MACRO. And several similar macros that vary only in one word can be placed together and referred to by a lowercase description in place of the uppercase letters: SHUTDOWN_INTERFACE_type |
| | (where type could be ETHERNET, TOKENRING, etc.) |
| | The line following the edt: line are the description of the API item. The description spans until the line on which the next field is recognized, or when the end of the template is detected. |
| edt_end: *(optional)* | Declares the end of an embedded documentation template. Normally, this field is not required. The documentation template ends implicitly when the C-language end-of-comment delimiter (*/) is recognized. The edt_end: field is used to terminate a documentation template inside of a C-comment, so that text (such as a development note by the engineer) can be included in the comment without it being published. |
| include: *(optional)* | Permits all of part of an embedded documentation template to be located in a file that is external to the code. Used for relocating verbose text and for simplifying extraneous information from a source file. |
| | include {filename} {tagname} |
| | The tagname is optional. If tagname appears on the line, then docx will open the file called 'filename' and will search for the line containing <tagname>. The lines following this marker spanning to the line before the marker</tagname> are parsed as though they were in the original source file. In this way multiple entries can be stored in a single external text file. If tagname is absent, the entire file is read. 'tagname' is case sensitive. |

Figure 2A

| Control Tag Name | Description |
|---|---|
| | There are two caveats with the include: filed. The first is that include: is recursive, so it is possible to open an external file using an include: and within that file to find another include: leading to another file. docx checks the combination of filename and tagname to ensure that it is not opening the same file twice for the same region of text. The second caveat is that docx uses the C comment delimiters (/* and */) to orient itself within the body of the file it is reading. When lines are included: from another file, docx assumes that they are also within a comment, so by using include: you are taking responsibility to see that the /* and */ in the included file maintain integrity and symmetry with the original file. |
| example: *(optional)* | Includes a code example from the source code. |
| | example: {filename} {tagname} |
| | The tagname is case sensitive. docx opens the file called filename and extracts the text between <tagname> and </tagname> and copies it verbatim. The example is identified for printing in a monospace font (courier). In live source code the tag delimiters would be embedded in one-line comments immediately before and after the code example: |
| example of use | /* <tagname> */ |
| | ...code example lines... |
| | /* </tagname> */ |

Figure 2B

| Engineering Tag Name | Description |
|---|---|
| name: *(required)* | Usually specified on the edt: line. |
| | For version 3.2 and later, 'name:' is redundant with 'edt' and should not be used. |
| category: *(required)* | Usually specified on the edt: line. |
| | For version 3.2 and later, 'category:' is redundant with 'edt:' and should not be used. |
| prototype: *(optional)* | Overrides 'prototype_end:' and lexical analysis. |
| | The prototype: filed causes lines spanning from the line below it to the end of the template or the start of the next field to be used as the prototype. The lines are expected to look like traditional (Cisco) comments with the leading asterisks, which are removed. Once a prototype has been found within the template, the lines of code after the template are ignored. |
| prototype_end: *(optional)* | Overrides lexical analysis extraction of the prototype from the source code |
| | If the prototype: field is not found within the template, then the lines of code from the end of the template to the beginning of the next template are searched for the keyword prototype_end. This would normally appear on a line by itself embedded within a C comment, such as: |
| | * end of template |
| | */ |
| | ...lines containing prototype... |
| | /* prototype_end */ |
| | The lines spanning from the line following the end-of-template to the line before the one containing prototype_end are gathered and used for the prototype. Comments are filtered out as part of preparing the prototype. If prototype: and prototype_end were not found, and if the category: field is not identified as a 'remark', then docx will fall back into lexical analysis to identify and extract the prototype. Lexical analysis uses clues such as the suffix of the file name being read, and the keyword from the category: field (or edt: line), to help identify and extract the prototype. Lines are searched from the end of the template to the start of the next template. The lexical analysis is not perfect, but it works fairly well. you should allow your template to default to lexical analysis at first. Run docx and check the results. If the results are not satisfactory, then use prototype_end to specifically delimit the prototype. Run docx again. If the results are still unsatisfactory, use the prototype: field. The use of the prototype: field gives you complete control over what appears in the final document at the expense of maintaining the prototype in two places (in the code and in the template/comment). |
| use *(optional)* | Tags information for inclusion in the Usage Guidelines paragraph. |
| | Information on lines below the line containing the use: keyword appear in the "Usage Guidelines" part of the document. |

Figure 3A

| Engineering Tag Name | Description |
|---|---|
| title: *(optional)* | Tags a title to separate and identify blocks of text. Usually used in remarks. |
| | Use in remarks to create a heading to separate blocks of descriptive text. The text appearing on the line following the title: keyword is used for the heading. |
| return: *(optional)* | Tags text to appear in the "Return Value" paragraph of the document. |
| | The text appearing on the line following the return: keyword contains the return type to be listed. Text on lines below the return: line are used as descriptions and are displayed beneath the return type in the document. |
| argument: *(optional)* | Tags text for arguments past to an API function. |
| | The arguments passed in to a function call. Each argument is shown on an argument: line by itself. Also on the line, the keywords { IN| OUT | INOUT } indicate whether the argument requires initialization and whether it contains an important value on return. |
| element: *(optional)* | Tags text for an API. |
| | Used for elements for a structure of any API item consisting of sub-parts |
| item: *(optional)* | Tags text for an API. |
| | Used for any API item not covered in the other categories of tags. |
| macro: *(optional)* | Tags text for a macro used in an API. |
| | Used when a single API entry will describe multiple macros, such as a range of #define(s) that apply different values for the same variable. The macro keyword enables the engineer to tag text for describing a single #define line and to set that apart from other descriptions of the group. |
| message: *(optional)* | Tags text for an error or debugging message. |
| | Used for any debugging or error message. |
| parameter: *(optional)* | Tags text for configuration commands. |
| | Used for any configuration command. (*Note: Control Point Is implementing a similar functionality in Nextgen to document configuration commands from the command definition file rather than in the source code.*) |
| keyword: *(optional)* | Tags text for configuration commands. |
| | Used for any configuration command. See note in 'parameter' above. A keyword is an unchanging token. A parameter is a variable, usually consisting of restrictive syntax. |

Figure 3B

| Documentation Tag Name | Description |
| --- | --- |
| publication: *(required)* | Identifies the chapter inside the publication that is the final destination for the template. |
| default_publication: | The automatic default is "IOS_API_Reference". |
| part: *(optional)* | Identifies the part within a large publication that is to contain the chapter that holds the template. |
| default_part: | *No automatic default.* |
| chapter: (required) | Identifies the chapter inside the publication that will receive the template. |
| default_chapter: | *No automatic default, must be specified in the file.* |
| section: (optional) | Identifies a section within a chapter that will receive the template. |
| section_default: | *No automatic default.* |
| subsection: (optional) | Identifies the subsection within a section that will receive the template. |
| subsection_default: | *No automatic default.* |
| audience: (required) | Automatic defaults is 'toolkit'. |
| | This controls the scope of distribution, and is therefore critical for maintaining security over proprietary trade-secret information. There are currently three valid keywords for the audience tag: toolkit, internal, and private. |
| | The automatic default, toolkit, means that the information in the template is for general public release to customers outside of Cisco. |
| | The internal keyword indicates that the information in the template is for release to other business units within Cisco and not any person outside of Cisco. You would use internal to document API functionality for a partner group within Cisco. |
| | The private keyword indicates that the information is for use of the component or code ownership group only, and is not for release outside of the component employees. You would use private to document the internal function calls inside your code. This makes it possible to generate a document showing all your function calls (and optionally) the source code for them and is intended for use in creating documentation to train/mentor new engineers in your group who will be maintaining the code. |
| | Templates marked private are often embedded in source code (.c files), whereas internal and toolkit templates are most often found in header files. |
| codefile: (required) | Identifies the component and location of the source code. |
| default_codefile: | Automatically generated from CVS header information if available, otherwise it is required. |

Figure 4A

| Documentation Tag Name | Description |
|---|---|
| source: | A synonym for default_codefile, which is how it is identified in the CVS header. |
| | In Nextgen the path to the source code is the name of the component. For this reason, the codefile tag identifies both the location of the code and the component that the code belongs to. This information is critical for documentation use of the template. |
| | The location of the source code is necessary for editors/writers to be able to read the source and compare it with the Engineer's rendition of the API to see if the functionality of the code is accurately represented in the description, or whether the text is misleading. |
| | The location of the source code also enables an editor to |

Figure 4B

| Invocation Flags: | Description |
| --- | --- |
| -t | Text output. Print the names of the templates only. |
| -f | Text output. Print the template names and the fields, but no remarks. |
| -a | Text output. Print everything. |
| -b | Binary Node Format output. |
| -r | Rich Text Format output. |
| Optional flags | |
| -c | Forces the lines of code following the template to be printed. |
| -e | Echoes the output to the console (tex mode only). |
| -D | Inhibits the printing of all documentation fields. (Text and RTF format) |
| -h | Generates individual HTML files for each template. |
| -m | Generates individual nroff (man page) files for each template. (*In development.*) |
| -s | Piped I/O (stdin and stdout) rather than file I/O. (*Not yet implemented.*) |
| Output filtering | |
| -i | Permits the printing of audience: Internal templates. |
| -P | Permits the printing of audience: Private templates. |
| -T | Inhibits the printing of audience: toolkit templates. |
| Output sorting | |
| -s | Alphabetically sorted output. (*Not yet implemented*) |

Figure 5

METHOD AND APPARATUS FOR EXTRACTING DATA FROM FILES

BACKGROUND OF THE INVENTION

1. Field of the Invention

The present invention relates generally to methods and apparatus for automatically extracting data from a file. More specifically, the present invention relates to automatically extracting documentation information that is embedded within a software program for the purpose of creating code documentation related to the software program.

2. Description of the Related Art

The software industry is expanding at a frenetic pace. As a result of this expansion, software now touches almost every aspect of our lives. For example, we cook our food in stoves and microwaves that are likely to include programming capabilities. Many of us do business on a computer using various word processing and data base applications, for example. Various recreational outlets are also available that utilize software, such as video games and television sets.

To meet this high demand for software products and services, the software industry continuously strives to increase its software output and decrease its software development time. As a result, the software industry has found various ways to increase the pace of software development. For example, one way to increase software development efficiency is to modularize software so that a particular software module may be used within more than one program. Thus, a new software application may be quickly developed by combining existing software modules and possibly adding newly created modules. Modularization of software may also facilitate modification of software since, in theory, it's easier to determine where to make changes within a modularized program than in a nonmodularized program.

However, modularization of software is one of the reasons why there is a need for robust software documentation. In other words, in order for software to be shared efficiently, software must be adequately documented so that a programmer does not have to spend too much time determining how to implement or make changes to each software module. Additionally, software developers need documentation for a particular module in order to develop additional software that is compatible with the particular software module.

Although there are many techniques available today for automatically documenting code, these techniques fall into two broad categories. The first set of documentation techniques implement an "enforcement approach." In this first approach, the programmer develops code within a specific environment, such as a Computer Aided Software Engineering (CASE) tool, that enforces collection of information that is then used to document the code. For example, before the programmer can begin creating her code, the programmer is required to go through various planning stages, such as generating flowcharts, drawings, or text proposals. By way of another example, the programmer may be forced to document her code in a specified manner prior to checking in her completed code.

Although the enforcement approaches provide a mechanism for ensuring that the code is adequately documented, the enforcement approaches have several disadvantages. For example, the programmer must learn how to work within the specific environment and follow the specific enforcement rules of the particular CASE tool in a specified order. That is, the programmer must know what to do for each enforcement procedure. Thus, the enforcement approach requires many man-hours for the programmer to learn how to comply with the particular enforcement requirements and how to work within the specific enforcement environment. Additionally, an individual programmer may not need to follow certain enforcement rules (e.g., creating a flowchart prior to coding), and thus, valuable time is wasted by enforcing inflexible documentation rules on all programmers. In sum, the enforcement approach may get in the way of software production by forcing the programmer to perform pointless, and sometimes complicated, tasks.

The second set of techniques for automatically documenting code implement a kind of "artificial intelligence" (A/I) approach. In general, an A/I approach is implemented on the completed code. That is, the completed code is read by a code interpreter that converts the code into code documentation. Although the A/I approaches give programmers more freedom to develop code without stringent enforcement requirements than the enforcement approaches, A/I approaches have their gown disadvantages. For example, the A/I approach is typically unreliable and cannot accurately interpret certain portions of the code and convert the portions into meaningful documentation.

Additionally, the code interpreter is limited to interpreting and documenting what is contained within the code. That is, the interpreter may fail to include relevant documentation. For example, if the programmer uses information that is not within the code to write the code, this extrinsic information is typically not included within the code itself. By way of specific example, the code typically does not include such information as the intended purpose of a particular function over another. Thus, the intended purpose of a particular function is left out of the documentation, even though this information may be relevant for interpreting and implementing the code.

In view of the foregoing, there is a need for methods and apparatus for creating code documentation that are simple to use and produce meaningful documentation. Specifically, there is a need for flexible methods and apparatus that allow a programmer to choose any programming environment for generating code and inputting corresponding documentation that sufficiently describes the code. Additionally, there is a need for an easy-to-use technique and system for automatically generating code documentation directly from the generated code and corresponding documentation input.

SUMMARY OF THE INVENTION

Accordingly, the present invention provides an apparatus and method for automatically creating code documentation from the code, itself. Simple tags are added to the code and used to extract relevant documentation information from the code and/or other documentation or code files.

In one embodiment a method of creating or modifying a documentation output object that describes a portion of computer code is disclosed. A documentation input object within a code file that is associated with a first documentation information object is provided. The first documentation information object is extracted based on the documentation input object. The first documentation information object is output to the documentation output object.

In a preferred embodiment, the extraction of the first documentation information object is based on a position of the documentation input object. In another embodiment, the method further includes the act of formatting the documentation output object based on the documentation input object. Additionally, the documentation information object may be located either within the code file or outside of the code file.

In other embodiments, the documentation input object is in the form of an engineering tag within the code file for identifying the first documentation information object for extraction to the documentation output object. The method may further include the act of providing a documentation tag within the code file for indicating how to extract a second documentation information object. The method may also include the act of filtering out the second documentation information object based on the documentation tag such that the second documentation information object is not output to the documentation output object.

In yet an other embodiment, the documentation input object may also be in the form of a control tag within the code file for indicating from where to extract the first documentation information object. The method may also include output ting the first documentation information object to a data structure.

In another aspect of the invention, a method of creating a data structure is disclosed. A plurality of tags are provided, wherein each tag is associated with a documentation information object. The documentation information objects are extracted based on the associated tag(s). The documentation information objects are arranged in a predetermined order. Additionally, the data structure is formed from the arranged documentation information objects. In a preferred embodiment, the data structure is in the form of a binary tree. In the binary tree, the tags are the in the form of a plurality of templates; each template is associated with a plurality of fields; and each field is associated with a text object. In an alternative embodiment, a first one of the templates is linked to the right with a subsequent template from the plurality of template; each template is linked to the left with a first one of the associated fields, with each associated field being linked to the left with a subsequent one of the associated fields; and each field is linked to the right with an associated text object.

In yet another embodiment, a computer readable medium containing program instructions for creating or modifying a documentation output object that describes a portion of computer code is disclosed. The computer readable medium includes computer readable code for (1) providing a documentation input object within a code file that is associated with a first documentation information object, (2) extracting the first documentation information object based on the documentation input object, and (3) outputting the first documentation information object to the documentation output object.

In another embodiment of the present invention, a computer system for creating or modifying a documentation output object that describes a portion of computer code is disclosed. The system includes a code file having a documentation input object that is associated with a first documentation information object and a documentation device that is configured to extract the first documentation information object based on the documentation input object and output the first documentation information object to the documentation output object.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 2A and 2B are lists of control tags in accordance with one embodiment of the present invention.

FIGS. 3A and 3B are lists of engineering tags examples in accordance with one embodiment of the present invention.

FIGS. 4A and 4B are lists of documentation tags in accordance with one embodiment of the present invention.

FIG. 5 is a list of invocation flags in accordance with one embodiment of the present invention.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general terms, the present invention provides systems and methods for generating documentation for computer programs or code. Simple tags are provided by the programmer, for example, within the code itself that are related to the documentation information. These tags may then be used to extract the documentation information from the code and output the documentation information as code documentation. Thus, the code may be read and interpreted to create relevant code documentation based on the tags, tagged documentation information data, and/or actual code data.

In one aspect of the present invention, a tag is associated with certain documentation information within the code file that is then formatted and output as code documentation based on the tag. In other words, the tags may be used to identify certain documentation information that is to be incorporated into the code documentation. Also, the tag may indicate how to format and output the documentation information to the code documentation. In another aspect, tags may be used to indicate how to handle a group of tags and associated documentation information that are associated with a particular code portion (e.g., a prototype, such as a function or macro). In another aspect of the present invention, tags are associated with code portions that are to be incorporated into the code documentation.

Figure 1:
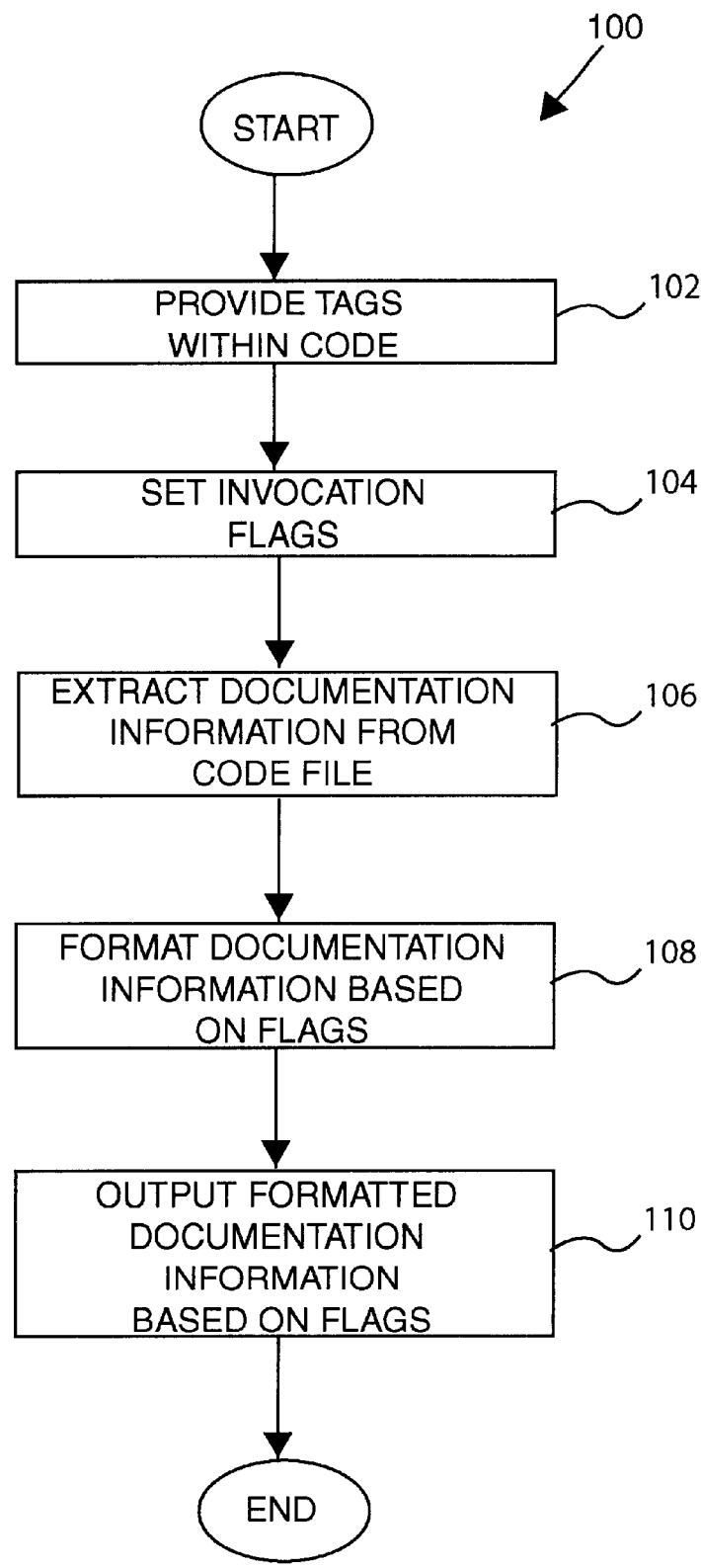
FIG. 1 is a flowchart illustrating a method of generating code documentation in accordance with one embodiment of the present invention.

FIG. 1 is a flowchart illustrating a process 100 of generating code documentation in accordance with one embodiment of the present invention. The process 100 may be divided broadly into two main functions. First, in operations 102 and 104, documentation input is provided within a particular code file and/or included within the invocation command for executing the documentation procedure. The documentation input indicates how and what to document for the code file. Second, in operations 106 through 110, the documentation procedure generates code documentation based on the provided documentation input.

Documentation Input

The documentation input may be in any suitable form for identifying and providing documentation information of relevant code portions and/or identifying code portions. For example, documentation input may be in the form of text objects within a code file that also includes the relevant code portions or within a specific documentation input file. Alternatively, documentation input may be provided in the form of invocation input that is input during commencement of a code documentation procedure.

Documentation input may be provided in the form of tags as described in operation 102. A particular tag may be associated with relevant documentation information that describes a corresponding code portion. Alternatively, a particular tag may be associated with another group of tags that are each associated with relevant documentation information portions, and the particular tag may describe how to process the documentation information portions.

The tags may be included within a source code file so that they may be used to generate code documentation for the code file. The tags may be included in any suitable portion of the code so long as they are distinguishable from the surrounding code. For example, the following lines represent four tags ("edt:", "Argument:", "Argument:", and "Use:") within comment lines of a C source code header file:

```
/* edt:     * function my_function()
 * Argument: void *inarg
 *             A pointer to a buffer containing input arguments. May
 *             be NULL.
 * Argument: ulong_t func
 *             The size, in bytes, of the inarg buffer.
 * Use:      All status and control functions for an interface are
 *             accessed through this vector.
 */
```

In the above example, the tags are separated from the code since they are located within comment lines. Additionally, the tags are in the form of text objects that are followed by a colon (:) such that the tags are distinguishable over normal comment text objects.

In the above example, the tag "edt:" indicates the beginning of a listing of tags (also referred to as "fields" or "field tags" ) that are associated with a particular code portion, such as a macro or function. The listing of tags include two "Argument:" tags that are associated with a text object that describes inputs for the particular code portion and a "Use:" tag that is associated with a text object that describes how to use the particular code portion.

The tags may be associated with a plurality of specifications that control various aspects of how the code is documented and/or may also be included within the code documentation. In the above example, the specification "*" of the tag "edt:" indicates that the following listing of tagged documentation information will be incorporated into a previously defined default chapter; the specification "function" indicates that the associated code portion is in the form of a function; and the specification "my_function( )" indicates a reference name for the function that will be included within the code documentation. The specifications "void *inarg" and "ulong_t func" of the "Argument:" tags indicate the names of arguments of the function (or particular code portion). Note that the tag "Use:" does not include specifications.

The tags may also be followed by a text object that is to be included within the documentation. In the above example, the tag "argument:" is followed by the text object "A pointer to a buffer containing input arguments. May be NULL." Various types of tags, specifications, and text objects are explained further below in reference to FIGS. 2 through 4.

One advantage of the present invention is that the tags may be entered in any suitable manner as long as the tags are distinguishable from the code. For example, tags may be entered into a code's comment lines using any editor. Thus, a programmer may take advantage of the code documentation capabilities of the present invention without having to learn how to use another editor.

The tags may serve any code documentation purpose. To name a few examples, the tags may indicate what documentation information to include within the code documentation, where to find documentation information to include in the code documentation, how to format the documentation information within the code documentation, and/or the type of code documentation (e.g., output to a file and/or output to a computer display).

In one embodiment, the tags are divided into three general categories: control, engineering, and documentation tags. Control tags indicate how to extract and/or interpret documentation information and/or associated code portions. Engineering tags identify documentation information to include within the code documentation. The identified documentation information describes characteristics of the code. Documentation tags indicate how to sort, filter, and transmit a tagged portion of documentation information to the correct audience or code documentation. FIGS. 2 through 4 provide example lists for each tag category.

FIGS. 2A and 2B are lists of control tag examples in accordance with one embodiment of the present invention. An example of a control tag is the "edt:" tag. This tag marks the beginning of a group of tags (hereafter referred to as a "template). A template includes tags (hereafter referred to as "fields") that are used to document a particular prototype. A prototype may be any type of code component, such as a function, macro, structure, or variable. The lists of tags and prototypes are merely illustrative and are not meant to restrict the scope of this invention.

Another example of a control tag is the "include" tag, which specifies another documentation input file that includes a portion of the template. That is, the "include" tag indicates that documentation input is located outside the code file. When the documentation procedure is implemented on the code file, documentation information may then be extracted from the "include" file. Preferably, the documentation procedure is recursive. For example, if the first "include" file has additional "include" tags, documentation information is also extracted from a second "include" file.

FIGS. 3A and 3B are lists of engineering tag examples in accordance with one embodiment of the present invention. These tags are used to identify text that will be incorporated into specific sections of the code documentation. Additionally, these tags describe portions of the code. For example, the field "Argument:" identifies text objects that describe the arguments of a particular function. The "Argument" text objects may then be extracted and included in the code documentation.

FIGS. 4A and 4B are lists of documentation tag examples in accordance with one embodiment of the present invention. Documentation tags are used to identify meta-information about the templates that is used to manage the templates and direct output. By way of example, "default_chapter:" is used to identify a default chapter. When a template does not include a defined chapter, documentation information for the template may then be included within the specified default chapter of the code documentation. By way of another example, "audience: private" is used to identify a portion of the documentation information as private, and private documentation information is filtered out during certain types of code documentation.

In operation 104, documentation input may be in the form of invocation flags that may be set by the user, for example, while invoking the documentation procedure. These invocation flags allow the user to select certain options for generating the code documentation, such as determining the format of the code documentation and how the code documentation is output. By way of example, the programmer may input a flag that selects a "private audience" option so that code documentation is only generated for certain public portions of the templates and/or code (e.g., the documentation information that is tagged as private is not output). By way of another example, the user may select a type of output, such as to output the code documentation to a computer display.

FIG. 5 is a list of invocation flags in accordance with one embodiment of the present invention. For example, the user may invoke a documentation procedure "docx" by the following:

docx (-flags) (infile) (outfile)

In this example, the user invokes the program docx and inputs a plurality of flags (-flags), a documentation input file (infile), and a code documentation output file (outfile). Of course, the above example is merely an illustration and is not meant to limit the scope of the invention. That is, operation 104 is optional, and the user may be prohibited from selecting options. In other words, the code documentation format and/or output type may depend on invocation flags (or other forms of documentation input) or may be preset and unchangeable by the user.

Documentation Procedure

The documentation procedure (e.g., 106 through 110) may be performed at any point during or after entering of documentation input. For instance, the code documentation may be generated even prior to entering all relevant documentation information. The code documentation may then be used as a check by the programmer as each code section is completed.

In operation 106, documentation information is extracted from the code file. For example, documentation information that is in the form of templates, tags or fields, text, and/or prototypes is extracted from the code file. One embodiment of this extraction process is further explained below in reference to FIGS. 6A and 6B. Preferably, as the documentation information is extracted, it is also organized and arranged in a data structure. Any suitable type of data structure for arranging the documentation information may be implemented that allows easy access to the extracted documentation information.

For example, in one embodiment the data structure is in the form of a binary tree. A binary tree is an internal representation of the templates, template fields, and text objects (remarks) that are related to code portions within the code file.

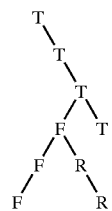

In the above binary tree example, each item (e.g., template (T), field (F), and remarks (R)) include a right and a left link. Each template is linked to the right of the previous template. That is, as documentation information is extracted from the code file, a linked chain of templates is created and each template is linked to the previous template. Likewise, as fields are extracted for a particular template, the fields are linked and chained to the left of the particular template. Also, any text objects or remarks that are associated with a particular field are linked and chained to the right of the particular field. Thus, the templates, fields, and remarks are linked in a specific way such that they may be readily ascertained and/or accessed from the binary tree.

The generation of a data structure from the code file has many advantages. For example, each time a particular code file is modified, a new data structure may be generated and then compared to a previous data structure. Thus, documentation changes may then be readily incorporated into the code documentation without creating new documentation each time the code is modified. Additionally, the data structures may be used by the programmer to determine what changes have recently been made to the code.

Figure 6A:
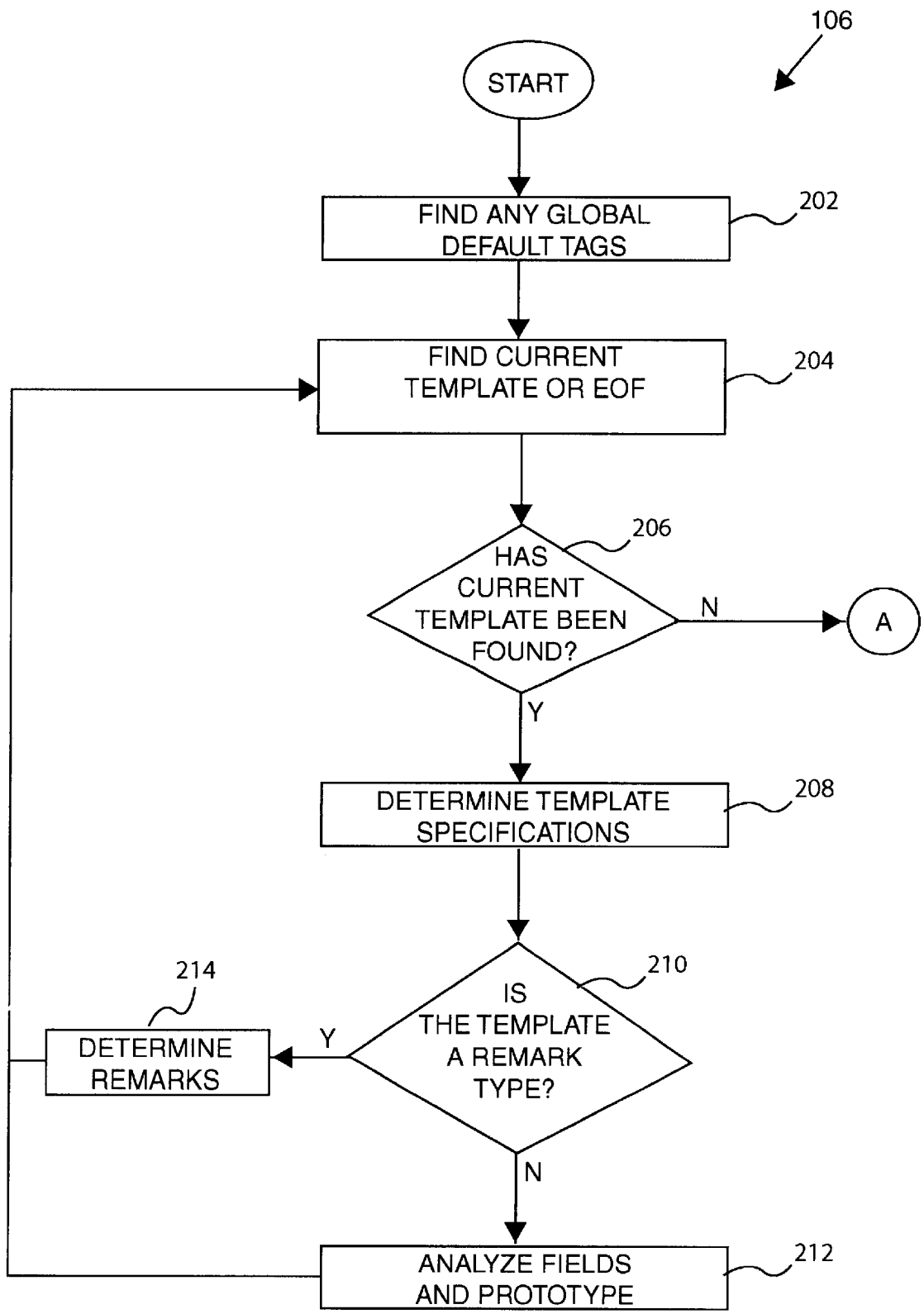
FIGS. 6A and 6B are flowcharts illustrating the operation of FIG. 1 of extracting documentation information from the code files in accordance with one embodiment of the present invention.
Figure 6B:
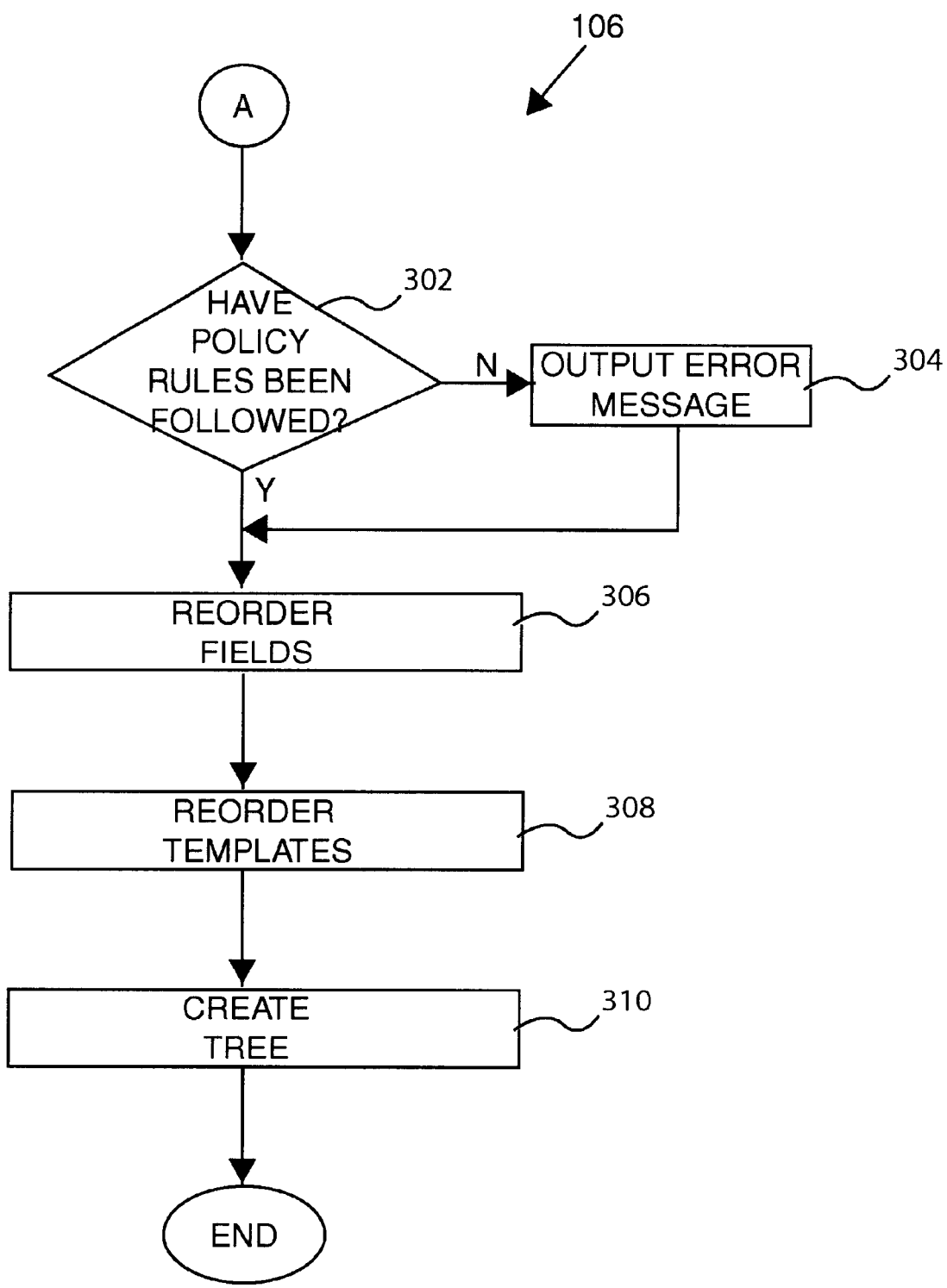

FIGS. 6A and 6B are flowcharts that further illustrate the operation 106 of FIG. 1 of extracting documentation information from the code files in accordance with one embodiment of the present invention. Initially, in operation 202 any global tags are found. Global tags may be applied to all templates for a particular code file or may only be applied to templates that do not specify a corresponding local tag and/or specifies that a global tag should be applied. For example, global default tags are applied to each template that does not specify a corresponding local default tag and/or specifies a default setting.

The global tags may be found by implementing any suitable technique that is capable of distinguishing the global tags from the computer code. For example, a global tag may be located within a C program's comment lines that are located near the top of the program file.

```
/*
* Default_Chapter: Drivers
*/
```

In the above example, a default chapter (Drivers) is defined such that documentation information within a template is included within the default chapter of the code documentation when the defined default chapter is specified (e.g., by a "*") within the template. Operation 202 is optional, and may not be required if there are no global tags. Alternatively, global tags may be located within an individual template and applied to subsequent templates, for example.

A current template or end-of-file (eof) mark is then found in operation 204. The current template may be found using any suitable technique that is capable of distinguishing the template from the computer code. For example, the code file is sequentially scanned, line-by-line, until either a template or the end of the code file is reached. A template may be found by scanning for a tag that designates the beginning of a template (e.g., "edt:"). It is then determined whether the current template has been found in operation 206.

In this embodiment, a template is defined as a set of related fields and associated documentation information. For example, a template may include all fields within a single comment section that precede and describe a section of code. The following comment section example includes a plurality of tagged documentation information that describes a function called "con_control_ft" that follows the comment section. The template includes three tags: a beginning of template tag (edt:), a tag that is associated with the return of the function con_control_ft (Return:), and a tag that is associated with an argument of the function (Argument:).

```
/*
* edt:       drivers function con_control_ft
*            Typedef for the interface control function.
* return:    bool
*            Status of request, TRUE for success, False otherwise.
*            If FALSE, then errno will be set to indicate reason for
*            failure.
* Argument:  connector_st *connector
*            Pointer to the connector of the interface to control.
*/
typedef bool (*con_control_ft) (connector_st *connector);
```

If the current template has been found, the template specifications are then determined in operation 208. The template specifications may be determined using any suitable search technique. In the above example, when a beginning template tag is found (e.g., "edt:"), the specifications (e.g., "drivers function con_control_ft") for the template are located within the same line as the beginning template tag. Each keyword of the specifications (e.g., drivers, function, and con_control_ft) is also expected to be separated by white space.

The template specifications may include one or more keywords that specify how to control how documentation information is extracted from the template and/or output to the code documentation. In the above example, the specification keyword "drivers" indicates that any documentation information that is extracted from the current template is to be included within the "driver" chapter of the code documentation.

By way of another example, the keyword "function" indicates that the template documentation information describes a code portion that is a function. Thus, when the actual code portion that follows the template is extracted later, the extraction process is facilitated by knowing what type of code portion to expect. In other words, since the code portion's format is known, relevant code portions may be readily identified and extracted for the code documentation.

After the template specifications are determined, it is then determined whether the template is a remark type in operation 210. A remark type template inhibits the extraction of the template fields and prototype that may follow the template. Instead, the contents of the template (or remarks) are determined in operation 214 and are simply added to the code documentation in operations 108 and 110 of FIG. 1. If however, the template is not a remark type, the fields and prototype are analyzed in operation 212 of FIG. 6A. After the fields and prototypes are analyzed, a new current template or eof mark is found in operation 204.

Figure 7:
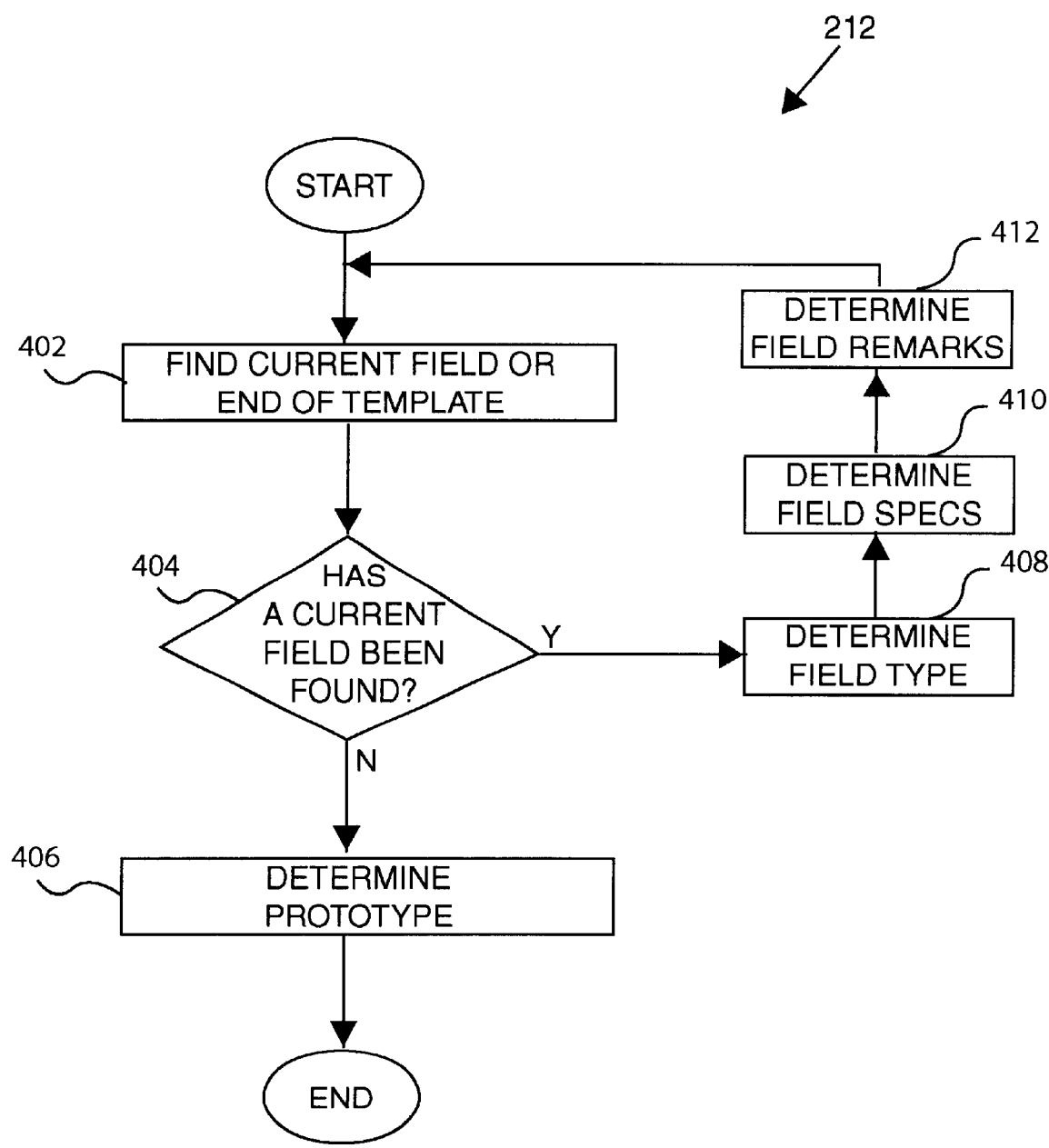
FIG. 7 is a flowchart illustrating the operation of FIG. 6A of analyzing the fields and prototype in accordance with one embodiment of the present invention.

FIG. 7 is a flowchart further illustrating the operation 212 of FIG. 6A of analyzing the fields and prototype in accordance with one embodiment of the present invention. Initially, a current field or the end of the template is found in operation 402. It is then determined whether the current field has been found in operation 404.

If the current field has been found, the field type, specifications, and associated text objects or remarks are determined, respectively, in operations 408 through 412. Any suitable technique may be implemented for determining the field type specifications, and associated remarks. For example, the field type corresponds to the field tag value; the field specifications are located on the same line as the field tag; and the associated remarks are found on the lines that follow the field tag and field specifications.

```
/*
* edt:       drivers function con_control_ft
*            Typedef for the interface control function.
* return:    bool
*            Status of request, TRUE for success, False otherwise.
*            If FALSE, then errno will be set to indicate reason for
*            failure.
* Argument:  connector_st *connector
*            Pointer to the connector of the interface to control.
*/
typedef bool (*con_control_ft) (connector_st *connector);
```

In the above example, the template may be scanned line-by-line to find the current field tag "Return:". The field type is found in the field name "Return:"; the field specification "bool" is read from the same line as the "Return:" tag. In this example, the field specification "bool" describes the format of the return value for the function "con_control_ft" as a Boolean return value. The field remarks are then read from the lines following the field tag and field specification. In this example, the remarks describe the meaning of the return value: "Status of request, TRUE for success, FALSE otherwise. If FALSE, then errno will be set to indicate reason for failure." The field tag "Argument" and associated field specifications and remarks are similarly determined.

When the end of the template is found, the prototype is then determined in operation 406. The prototype may be determined using any suitable technique. For example, the prototype may be extracted directly from the code line that follows the template, as would be the case in the above example. That is, the function "typedef bool (*con_control_ft) (connector_st *connector);" would be extracted from the code portion following the template. Preferably, a lexical approach is utilized to determine the prototype. For example, the file type (e.g., header file) and template keyword "function" are used to locate the prototype within the code lines following the template.

Alternatively, the prototype may be specified and identified by field tags within a portion of the template and/or code. For example, the field tag "prototype:" may be used to identify a portion of text as the prototype. That is, the prototype may then be extracted from the lines following the "prototype:" tag to the end of the template or the start of the next field, while the code portion after the template is ignored. Alternatively, the "prototype_end:" field may be inserted into a comment line after the template. In this alternative example, the lines spanning from the end of the template to the "prototype_end:" field are extracted and used as the prototype in the code documentation. Thus, the prototype may be part of the documentation input within the template and/or part of the code.

Returning to FIG. 6A, operations 204 through 212 are repeated for each template until an eof mark is found. Preferably, as discussed above, an internal data structure is also generated that includes readily accessible documentation information for each template. When an eof mark is found, it may then be determined whether policy rules (if any) have been enforced in operation 302 (continued from "A" in FIG. 6B).

Any suitable policy rules may be enforced to direct the programmer to include appropriate documentation input (e.g., templates, template specifications, tags or fields, field specifications, and/or text objects) for each type of prototype. For example, a programmer may be required to include "argument:" fields within a template preceding a function type prototype. If the programmer fails to follow the predetermined policy rules, any appropriate action may then be implemented. In this embodiment, an error message is output in operation 304 and the documentation procedure continues. Alternatively, the documentation procedure may halt while the programmer enters the required documentation input.

After the error message is output or after it is determined that the policy rules have been followed, the fields and associated remarks may be reordered in operation 306. Next, the templates may be reordered in operation 308. The particular order may be predefined or set by the user with the invocation flags and/or based on the order of the field tags. The reordered templates, fields, and remarks may then be output in the form of an internal data structure, such as the previously discussed binary tree, in operation 310. After the tree is created, the operation 106 ends and the process 100 proceeds to operation 108 of FIG. 1, wherein the documentation information is formatted and then output in operation 110.

Returning to FIG. 1, after the documentation information is extracted from the code file, the documentation information is formatted in operation 108 based on the value of the invocation flags and/or tags. Any suitable format for arranging the documentation information may be implemented for generating the code documentation. The format may be predefined or set by the user. For example, the user may set invocation flag values when executing the documentation procedure. As discussed above, FIG. 5 includes a list of invocation flags that are definable by the user. By way of example, the user may select the "-c" flag to cause the lines of code that follow the template to be printed after the template documentation information is printed within the code documentation. By way of another example, the code documentation may be output in the form of an HTML or RTF file.

After the documentation information is formatted, in operation 110 the formatted documentation information may be output in a form that is based on the values of the invocation flags. For example, the user may set an invocation flag to output the formatted documentation information to the display screen. Alternatively, the output format or type may be predefined and not alterable by the user.

Figure 8:
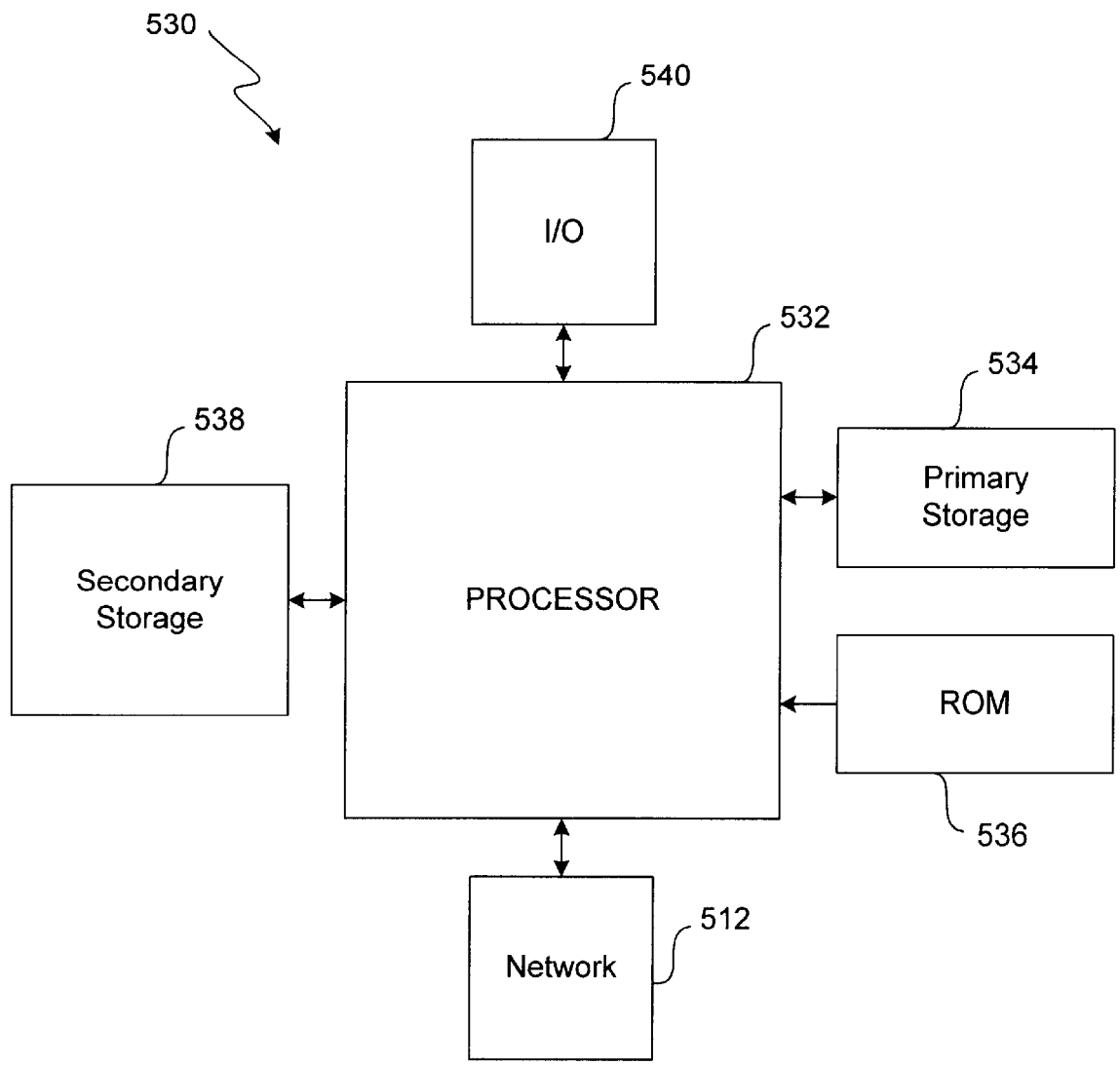
FIG. 8 is a diagrammatic representation of a computer system suitable for implementing the present invention.

FIG. 8 illustrates a typical, general-purpose computer system suitable for implementing the present invention. A computer system 530 includes at least one processor 532, also referred to as a central processing unit (CPU), that is coupled to memory devices. Processor 532 may be part of a network computer, e.g., processor 532 may be in communication with a network computer. The memory devices may generally include primary storage devices 534, such as a read only memory (ROM), and primary storage devices 536, such as a random access memory (RAM).

ROM 534 acts to transfer data and instructions unidirectionally to CPU 532, while RAM 536 is used typically to transfer data and instructions to and from CPU 532 in a bi-directional manner. Both primary storage devices 534, 536 may include substantially any suitable computer-readable media. A secondary storage medium 538, which is typically a mass memory device, may also be coupled bi-directionally to CPU 532. In general, secondary storage medium 538 is arranged to provide additional data storage capacity, and may be a computer-readable medium that is used to store programs including computer code, computer program code devices, data, and the like. In one embodiment, secondary storage medium 538 may be a system database which is shared by multiple computer systems. Typically, secondary storage medium 538 is a storage medium such as a hard disk or a tape which may be slower than primary storage devices 534, 536. Secondary storage medium 538 may take the form of a well-know device including, but not limited to, magnetic and paper tape readers. The information retained within secondary storage medium 538, may, in appropriate cases, be incorporated in a standard fashion as part of RAM 536, e.g., as virtual memory. A specific primary storage device 534 such as a CD-ROM may also pass data uni-directionally to CPU 532.

CPU 532 is also coupled to one or more input/output devices 540 that may include, but are not limited to, video monitors, track balls, mice, keyboards, microphones, touch-sensitive displays, transducer card readers, magnetic or paper tape readers, tablets, styluses, voice or handwriting recognizers, as well as other well-known input devices, such as other computers. Finally, CPU 532 may be coupled to a computer or a telecommunications network, e.g., an internet network or an intranet network, using a network connection as shown generally at 512. With such a network connection 512, it is contemplated that the CPU 532 may receive information from a network. CPU 532 may also output information to the network. Such information, which is often represented as a sequence of instructions to be executed using CPU 532, may be received from and outputted to the network, for example, in the form of a computer data signal embodied in a carrier wave. The above-described devices and materials will be familiar to those of skill in the computer hardware and software arts.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, the extraction operations may be performed in any suitable order for extracting documentation information, i.e., the global default tags may be extracted after the templates and prototypes are extracted. By way of another example, the internal data structure of the documentation information may be created prior to reordering the fields and templates. Accordingly, the present embodiments are to be considered as illustrative and not restrictive, and the invention is not to be limited to the details given herein, but may be modified within the scope and equivalents of the appended claims.

What is claimed is:

1. A method of creating or modifying a documentation output object that describes a portion of computer code, the method comprising the acts of:

providing a tag within a code file that is associated with a first block of the code file, the tag having a type that selectively specifies which portions of the first block to output automatically; and outputting the specified portions of the first block to the documentation output object, wherein the specified portions have a size that is less than a size of the entire first block.

2. A method as recited in claim 1, wherein the outputting of the specified portions of the first block is based on a position of the tag.

3. A method as recited in claim 1, further comprising the act of formatting the documentation output object based on the type of the tag.

4. A method as recited in claim 3, wherein the formatting is accomplished by placing the fist block at a specific location in the documentation output object.

5. A method as recited in claim 3, when the documentation output object is formatted as a specific type of document.

6. A method as recited in claim 3, further comprising the act of providing an invocation flag for indicating how to output the first block to the documentation output object, wherein the formatting of the documentation output object is further based on the invocation flag.

7. A method as recited in claim 1, wherein the specified portions of the first block describes a portion of the computer code.

8. A method as recited in claim 7, wherein at least one specified portion of the first block describes a use of the portion of the computer code.

9. A method as recited in claim 7, wherein at least one of the specified portions of the first block is located outside of the code file within another file.

10. A method as recited in claim 9, wherein the tag is in the form of a control tag within the code file for indicating from where to obtain the first block.

11. A method as recited in claim 10, wherein the act of outputting is performed recursively from multiple files outside the code file.

12. A method as recited in claim 7, further comprising the act of providing a second tag that also describes the portion of the computer code.

13. A method as recited in claim 1, wherein at least one of the specified portions of the first block is in the form of computer code within the code file.

14. A method as recited in claim 13, wherein the outputting of the specified portions of the first block is further based on the format of the computer code.

15. A method as recited in claim 1, further comprising the acts of:

providing a second tag within the code file that is associated with a second block of the code file, the second having a type selectively specifying which portions of the second block to output automatically; and outputting the specified portions of the second block to the documentation output object when a filter flag is not provided, wherein the specified portions of the second block have a size that is less than a size of the entire second block.

16. A method as recited in claim 15, further comprising the act of:

providing a filter flag; and filtering out the specified portions of the second block based on the filter flag such that specified portions of the second block are not output to the documentation output object.

17. A method as recited in claim 1, further comprising the act of providing a control tag for indicating how to output the first block to the documentation output object, wherein outputting of the first documentation output object is further based on the control tag.

18. A method as recited in claim 1, wherein the wherein the tag and the first block are configured such that they are distinguishable from the computer code.

19. A method as recited in claim 1, further comprising the acts of:

determining whether policy rules have been followed; and outputting an error message when the policy rules have not been followed.

20. A method as recited in claim 1, further comprising the act of outputting the specified portions of the block to a data structure.

21. A computer readable medium containing program instructions for creating or modifying a documentation output object that describes a portion of computer code, the computer readable medium comprising:

computer readable code for providing a tag within a code file that is associated with a first block, the tag having a type that selectively specifies which potions of the block to output automatically; and computer readable code for outputting the specified portions of the first block to the documentation output object, wherein the specified portions have a size that is less than a size of the entire first block.

22. A computer readable medium as recited in claim 21, wherein the outputting of the fist block is based on a position of the tag.

23. A computer readable medium as recited in claim 21, further comprising computer code for formatting the documentation output object based on the tag.

24. A computer readable medium as recited in claim 21, wherein the first block describes a portion of the computer code.

25. A computer readable medium as recited in claim 24, wherein the portion of the first block is located in another file outside of the code file.

26. A computer readable medium as recited in clam 25, wherein the tag is in the form of a control tag within the code file or indicating from where to obtain the first block.

27. A computer readable medium as recited in claim 21, wherein a portion of the fist block is in the form of computer code within the code file.

28. A computer readable medium as recited in claim 27, wherein the outputting of the specified portions of the first block is further based on the format of the computer code.

29. A computer readable medium as recited in claim 27, wherein the tag is in the form of an engineering tag within the code file for identifying the first block for outputting to the documentation output object.

30. A computer readable medium as recited in claim 21, further comprising:

computer code for providing a second tag within the code file that is associated with a second block of the code file, the second tag having a type selectively specifying which portions of the second block to output automatically; and computer code for outputting the specified portions of the second block to the documentation output object when a filter flag is not provided, wherein the specified portions of the second block have a size that is less than a size of the entire second block.

31. A computer readable medium as recited in claim 30, further comprising:

computer code for providing a filter flag; and computer code for filtering out the specified portions of the second block based on the filter flag such that specified portions of the second block are not output to the documentation output object.

32. A computer readable medium as recited in claim 21, wherein the tag and the fist block are configured such that they are distinguishable from the computer code.

33. A computer readable medium as recited in claim 21, further comprising:

computer code for determining whether policy rules have been followed; and computer code for outputting an error message when the policy rules have not been followed.

34. A computer readable medium as recited in claim 21, further comprising computer code for outputting the first block to a data structure.

35. A computer system for creating or modifying a documentation output object that describes a portion of computer code, the system comprising:

a code file having a tag within a code file that is associated with a first block of the code file, the tag having a type that selectively specifies which portions of the block to output automatically; and a documentation device that is configured to output the specified portions of the first block to the documentation output object, wherein the specified portions have a size that is less than a size of the entire block.

36. A method of creating or modifying a documentation output object that describes a portion of computer code, the method comprising the acts of:

providing a tag having a type, the tag being associated with a first block of the computer code, the type selectively specifying a format of the documentation output object and selectively specifying which portions of the first block to output automatically; and outputting the specified portions of block to the documentation output object in the specified format, wherein the specified portions have a size that is less than a size of the entire first block.

37. A method as recited in claim 36, wherein the specified format is a specified order of sub-objects within the first block.

38. A method as recited in claim 36, wherein the tag is an invocation flag.

39. A method as recited in claim 36, wherein the tag is a tag positioned within the file.

\* \* \* \* \*